(12) United States Patent
Ting et al.

(10) Patent No.: US 8,016,275 B2
(45) Date of Patent: Sep. 13, 2011

(54) RESILIENT VIBRATION ISOLATOR HAVING A PLURALITY OF BUMPS ON AN ENGAGEMENT SURFACE THEREOF

(75) Inventors: Kent Ting, South Lyon, MI (US); Craig W. Lewitzke, Commerce Township, MI (US); Patrick E. Fix, III, Waterford, MI (US); Dwayne R. Taylor, Livonia, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 763 days.

(21) Appl. No.: 12/058,818

(22) Filed: Mar. 31, 2008

(65) Prior Publication Data
US 2009/0243172 A1 Oct. 1, 2009

(51) Int. Cl.
*F16F 1/36* (2006.01)
(52) U.S. Cl. ........ 267/153; 267/136; 267/140; 267/141; 267/293; 248/635; 165/69; 180/68.4
(58) Field of Classification Search ............... 267/141.1, 267/152, 153, 140, 140.13; 248/232, 233, 248/634–638; 180/68.4; 165/68, 69, 140, 165/141, 144
See application file for complete search history.

(56) References Cited

U.S. PATENT DOCUMENTS

| | | | |
|---|---|---|---|
| 1,855,769 A | 4/1932 | Paton | |
| 2,534,137 A | 12/1950 | Lewis | |
| 2,764,341 A | 9/1956 | Greiner | |
| 3,436,042 A | 4/1969 | Goubergen | |
| 4,002,315 A * | 1/1977 | Van Goubergen | 248/633 |
| 4,062,585 A | 12/1977 | Herring, Jr. | |
| 4,215,841 A | 8/1980 | Herring, Jr. | |
| 4,519,467 A * | 5/1985 | Saunders | 180/68.4 |
| 4,651,839 A * | 3/1987 | Isobe | 180/68.4 |
| 5,123,625 A * | 6/1992 | Spaltofski | 248/634 |
| 5,758,860 A * | 6/1998 | Hanazaki et al. | 248/634 |
| 6,296,237 B1 * | 10/2001 | Nagai | 267/220 |
| 6,668,956 B1 * | 12/2003 | Pelage et al. | 180/68.4 |
| 7,117,926 B2 * | 10/2006 | Mori et al. | 165/67 |
| 7,331,054 B2 * | 2/2008 | Song | 720/692 |
| 7,331,874 B2 | 2/2008 | Lin | |
| 7,530,587 B2 * | 5/2009 | Okamoto et al. | 280/124.147 |
| 7,669,677 B2 * | 3/2010 | Ko | 180/68.4 |

FOREIGN PATENT DOCUMENTS
CN 1715089 A 1/2006
* cited by examiner

*Primary Examiner* — Robert Siconolfi
*Assistant Examiner* — Mariano Sy

(57) ABSTRACT

A dual-rate resilient isolator having a plurality of raised, generally conical bumps formed on an engagement surface thereof. The bumps in combination with a main body of the resilient isolator provide a dual-rate for isolating CRFM noise vibration and or other vibrations (via the relatively softer resiliency of the bumps) and isolating road vibration and shock (via the relatively harder resiliency of the main body) even though the bumps and the main body are composed of the same resilient material.

15 Claims, 4 Drawing Sheets

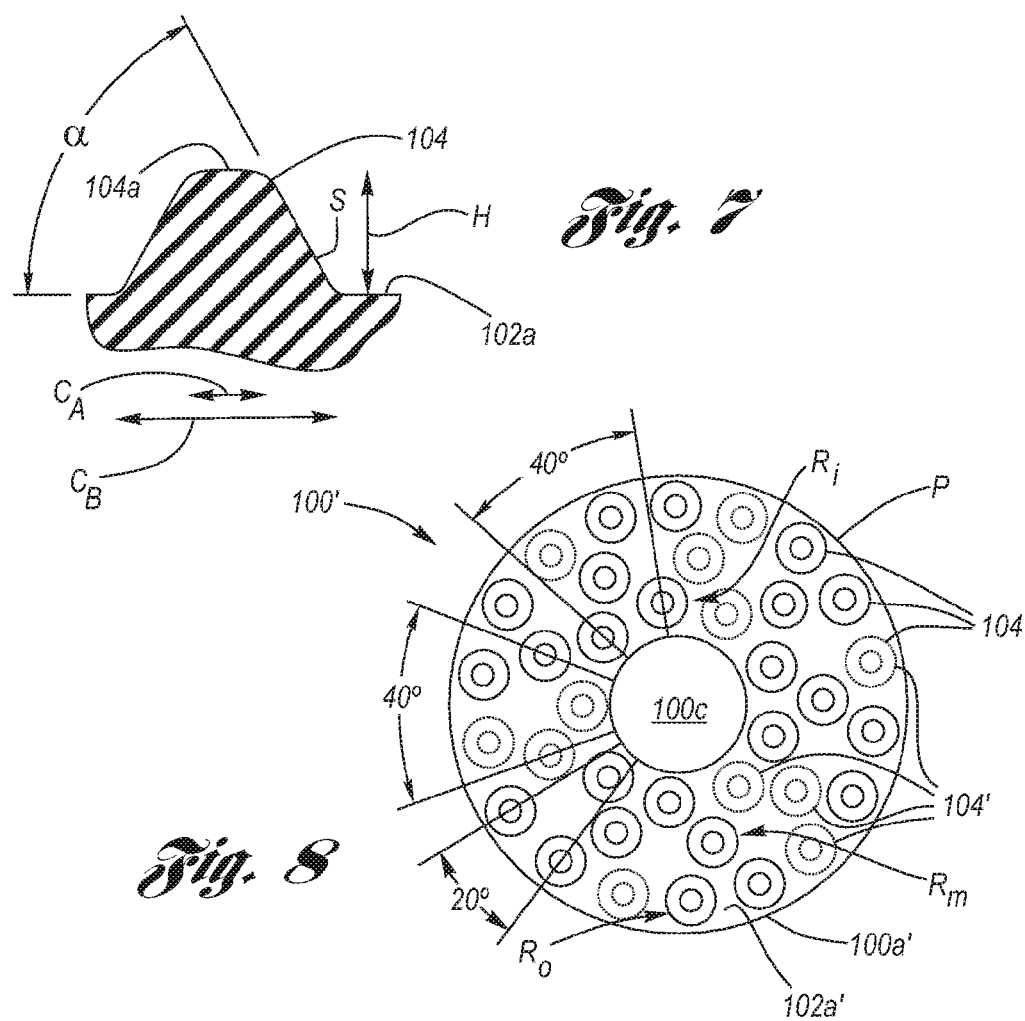
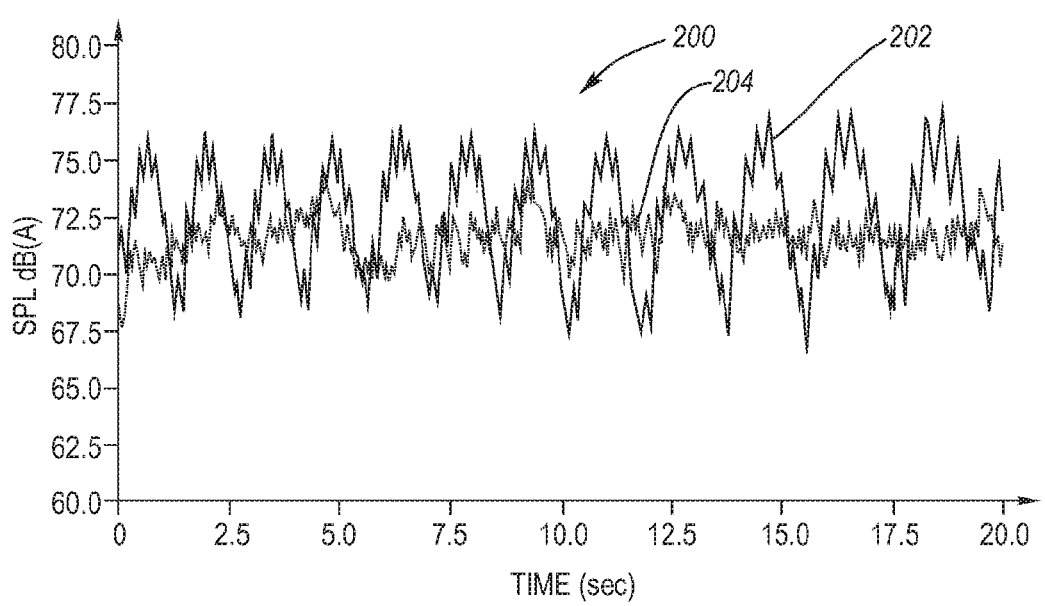

RESILIENT VIBRATION ISOLATOR HAVING A PLURALITY OF BUMPS ON AN ENGAGEMENT SURFACE THEREOF

TECHNICAL FIELD

The present invention relates to resilient vibration isolators, particularly those used for isolating vibration of motor vehicle condenser, radiator and fan modules (CRFM), and more particularly to a resilient vibration isolator having opposed engagement surfaces, wherein an engagement surface thereof is provided with a plurality of raised bumps.

BACKGROUND OF THE INVENTION

In situations where joined articles are subject to vibration, it may be desirable to isolate the vibration from passing from any one of the articles to the other. An example of such a situation occurs in motor vehicles with respect to the mounting of a condenser, radiator fan module (commonly referred to in the art as a "CRFM").

As shown by way of example at FIGS. 1 and 2, a CRFM 10 includes a mounting foot 12 one at each side thereof (only one side being shown in FIG. 1), wherein the mounting foot rests upon a resilient isolator 14, which in turn rests upon a cradle 16 (see FIG. 2). The resilient isolator 14 typically has a washer-like isolator main body 14a, a tubular isolator sleeve 14b integrally connected with, and in normal relation to, the isolator main body, and an isolator central bore 14c (see FIG. 2) extending through both the isolator main body and isolator central bore. An alignment stud 18 of the mounting foot 12 is press-fit into the isolator central bore 14c. One flat engagement surface 14e of the isolator main body 14a abuts the mounting foot 12. The isolator sleeve 14b passes through a cradle hole 16a, and the isolator sleeve has a small enough cross-section relative to the cross-section of the isolator main body 14a such that a second flat engagement surface 14f amply rests abuttingly upon the cradle.

Accordingly, it is seen that the weight of the CRFM 10 is supported by the cradle 16 through the resilient isolator, whereby vibration axially passing between the cradle and each foot is mitigated as it passes through the main body of the respective resilient isolator 14, and vibration transversely (or radially) passing is mitigated by the resiliency of the isolator sleeve 14b. By way merely of exemplification, the resilient isolator 14 is a "compression-style" single-rate resilient isolator, whereby a single resiliency rate is provided as between the cradle and the mounting foot.

In operation, the CRFM may produce fan noise vibration and/or vibrations, wherein from a noise and vibration perspective, it is desired to have a soft resiliency of the resilient isolator in order to decouple these noises and vibrations from passing from the CRFM to the cradle and then through the frame of the motor vehicle, thereby ensuring occupants of the motor vehicle are undisturbed thereby. In operation of the motor vehicle on the road, pavement irregularities produce jarring (or shocking) vibrations, wherein from a ride and handling perspective, it is desired to have a hard resiliency of the resilient isolator in order to prevent the cradle from delivering to the CRFM vibrations which can cause it to shake relative to the body of the motor vehicle.

Accordingly, to accommodate the dual perspectives of noise and vibration isolation and ride and handling isolation, a dual-rate resilient isolator is preferred over a single-rate resilient isolator (as shown at FIG. 1), in that a dual-rate resilient isolator provides a soft resiliency which, initially, isolates noise and vibration of the CRFM from passing to the cradle, and a hard resiliency, subsequently, which retains the CRFM in position with respect to the cradle during episodes of road induced jarring (shocking) vibration.

A dual-rate resilient isolator preferred in the prior art is known as a "shear-style" dual-rate resilient isolator 14', as for example shown at FIG. 2. The shear-style dual-rate resilient isolator 14', by way of example, may include a relatively harder resiliency insert material 14d embedded in the relatively softer resiliency material of the isolator main body 14a', wherein the isolator main body and the isolator sleeve 14b' are composed of the same softer resiliency material.

In operation, when small amplitude vibrations act upon (in cycles of compression and relaxation) the isolator main body 14a' between the mounting foot 12 and the cradle 16, the relatively softer resiliency isolator material isolates those amplitude vibrations from passing from the CRFM to the cradle. However, in large amplitude vibrations (in cycles of compression and relaxation), the relatively softer resiliency material of the isolator main body acts in shear with respect to the relatively harder resiliency material of the insert, whereby a hard resiliency response as between the CRFM and the cradle subtends, and thereby prevents the CRFM from shaking relative to the body/frame of the motor vehicle.

From a vehicle performance standpoint, dual-rate resilient isolators are superior to single rate resilient isolators; however, higher cost and investment, and reduced durability are detriments of the dual-rate resilient isolators.

Accordingly, what remains needed in the art is a dual-rate resilient isolator which has low cost and investment, high durability, and excellent vehicle performance.

SUMMARY OF THE INVENTION

The present invention is a dual-rate resilient isolator having a plurality of raised, generally conical bumps formed in an engagement surface thereof, whereby the bumps in combination with the main body of the resilient isolator provide a dual-rate for isolating low amplitude CRFM vibration (via the relatively softer resiliency of the bumps) and isolating large amplitude road vibration (via the relatively hard resiliency of the main body) even though the bumps and the main body are composed of the same resilient material, the resilient isolator having low cost and investment, high durability, and excellent vehicle performance.

Each of the bumps is raised a preselected height in an axial direction above the engagement surface. It is preferred for each bump to be of a frustoconical shape characterized by either a flat apex or a bluntly rounded apex, the apex being located at the maximum height of the bump. The resilient isolator is composed of a resilient material of a preselected resiliency, wherein the bumps, due to their height and relative small conic area as compared to the thickness and relatively large area of the main body, provide a soft resiliency, even though the main body and the bumps are integral and composed of one in the same resilient material.

The bumps are disposed on an engagement surface of the resilient isolator preferably for facing the mounting foot for the CRFM. The distribution of the bumps on the engagement surface is predetermined such that any applied vibrational load as between the mounting foot and the cradle is generally evenly distributed across the engagement surface.

Accordingly, it is an object of the present invention to provide a dual-rate resilient isolator composed of a singular resiliency material, wherein a plurality of generally conical bumps formed in an engagement surface thereof in combination with a main body of the resilient isolator provide a dual-rate of resilient response to vibration over a range of amplitudes, wherein the resilient isolator has low cost and investment, high durability, and excellent vehicle performance.

This and additional objects, features and advantages of the present invention will become clearer from the following specification of a preferred embodiment.

BRIEF DESCRIPTION OF THE DRAWINGS

FIG. 7 is a cross-sectional side view of an individual bump of the dual rate resilient isolator of FIG. 4.

FIG. 8 is a top plan view of an alternative dual-rate resilient isolator according to the present invention.

FIG. 9 is a graph of time versus noise vibration amplitude for a prior art resilient isolator and a dual-rate resilient isolator according to the present invention.

DESCRIPTION OF THE PREFERRED EMBODIMENT

Figure 1:
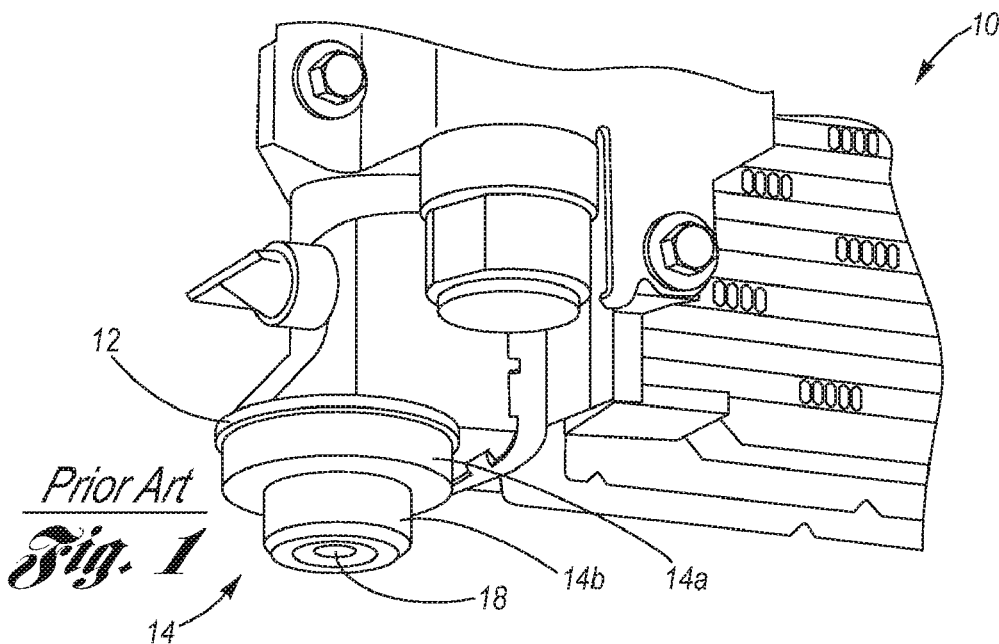
FIG. 1 is a broken-away, perspective view of a CRFM and a mounting foot thereof, and a prior art compression-style single-rate resilient isolator.

Referring now to the Drawing, FIGS. 3 through 10C, various aspects of a dual-rate resilient isolator according to the present invention are depicted.

Turning attention firstly to FIGS. 3 through 7, a preferred dual-rate resilient isolator 100 according to the present invention is shown, having mutually opposed first and second engagement surfaces 102a, 102b, wherein the first engagement surface has disposed thereat a plurality of raised, generally conical bumps 104. As can be discerned from FIG. 3, an example of operation locates the dual-rate resilient isolator 100 abuttingly between a mounting foot 12 of a CRFM (as per 10 at FIG. 1) and a cradle 16 (see also FIG. 2), wherein it is preferred for the bumps 104 to be in abutment with the mounting foot.

Figure 3:
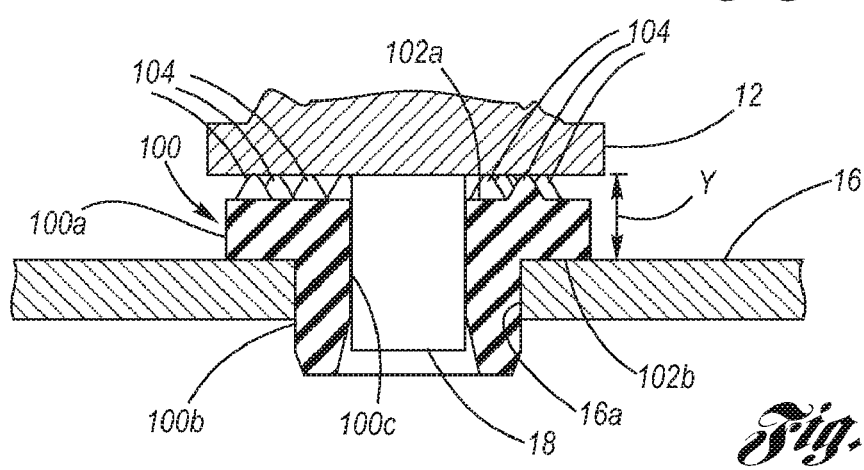
FIG. 3 is a perspective view of a dual-rate resilient isolator according to the present invention, shown in operation with respect to a mounting foot of a CRFM and a cradle.
Figure 4:
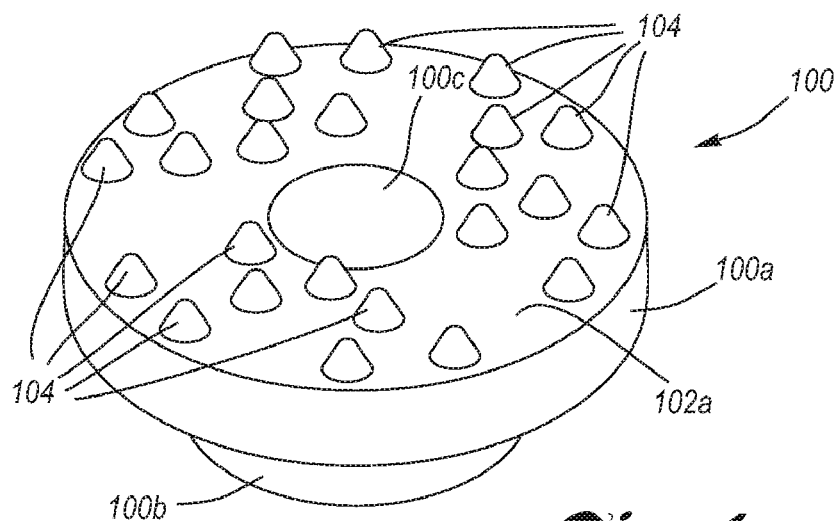
FIG. 4 is a top perspective view of a dual-rate resilient isolator according to the present invention.

In accordance with the example of operation of FIG. 3, the CRFM is supported and located at its lower extremity by a pair of dual-rate resilient isolators 100, whereby low and high amplitude vibrations passing between the cradle and the mounting feet will be mitigated as they pass axially through the main body of the resilient isolator 100. The isolator sleeve 100b will mitigate vibrations as between the cradle and the mounting foot (per the alignment sleeve thereof) in the transverse (or radial) direction.

The dual-rate resilient isolator 100 has a washer-like isolator main body 100a, a tubular isolator sleeve 100b integrally connected with the second engagement surface 102b of the isolator main body in normal relation thereto, having a much smaller cross-section than that of the main body, and an isolator central bore 100c passing through each of the isolator main body 100a and the isolator sleeve 100b.

Figure 2:
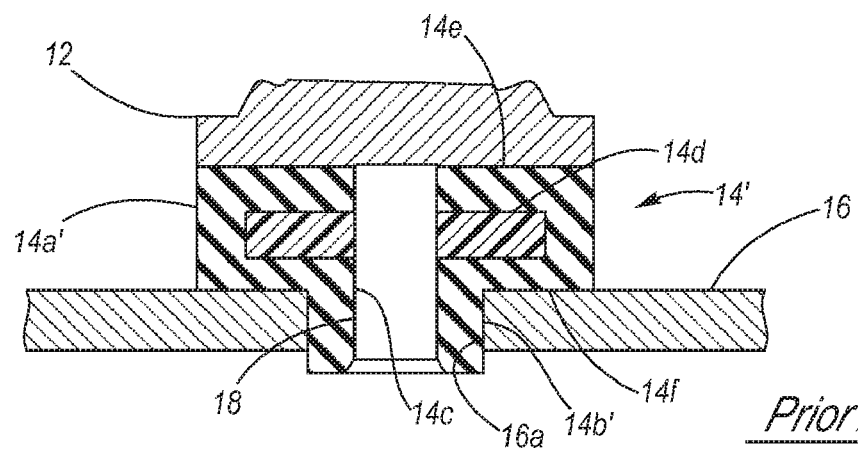
FIG. 2 is a perspective view of a prior art shear-style dual-rate resilient isolator, shown in operation with respect to a mounting foot of a CRFM and a cradle.

In the environment of operation shown at FIG. 3, which is in general concert with the art familiar operative aspects of FIGS. 1 and 2, an alignment stud 18 (see FIGS. 1 and 2) of the mounting foot 12 is press-fit into the isolator central bore 100c, and the bumps 104 of the first engagement surface abut the mounting foot. The isolator sleeve 100b passes through a cradle hole 16a, and the isolator sleeve has a small enough cross-section relative to the cross-section of the isolator main body 100a such that the second engagement surface 102b amply rests abuttingly upon the cradle.

As best seen at FIG. 7, each of the bumps 104 has a raised height H above the first engagement surface, and a basal bump cross-section $C_B$ that is very much smaller than the cross-section $C_M$ (see FIG. 6) of the isolator main body. While the generally conical shape of the bumps may be selected for a particular application, the preferred shape is frustoconical, characterized by either a flat or generally bluntly rounded apex 104a having a an apex bump cross-section $C_A$ which is much smaller than the basal bump cross-section $C_B$ at the first engagement surface 102a. The dual-rate resilient isolator 100 is composed of a resilient material of a predetermined resiliency per the particular application, wherein the bumps 104, the isolator main body 100a and the isolator sleeve 100b are all integrally formed as a single piece.

A first resiliency rate is provided by the relatively softer resiliency afforded at the bumps 104, in that the height H as compared to the thickness T of the isolator main body, and relatively very small bump area as compared to the area of the isolator main body 100a, even though composed integrally of the same material as the main body; whereas the relatively very large area and the thickness T of the isolator main body 100a provide a second resiliency rate that is much stiffer than that of the first resiliency rate.

By way merely of exemplification, the material may be a chloroprene rubber having a 50 durometer, the cross-section $C_M$ of the main body 100a may be about 48 mm, the thickness T of the isolator main body 100a may be about 8 mm, the cross-section $C_C$ of the isolator central bore 100c may be about 15 mm, the basal bump cross-section $C_B$ of a bump 104 may be about 5 mm, the apex bump cross-section $C_A$ of the bump may be about 0.5 mm, the height H of the bump may be about 3 mm, and the inclination angle α of the conic surface S of the bump with respect to the first engagement surface 102a may be about 60 degrees.

The bumps 104 are disposed on the engagement surface 102 of the dual-rate resilient isolator 100 in a predetermined pattern such that any applied load as between the mounting foot and the cradle is generally evenly distributed across the engagement surface.

An example of a bump pattern 104a of an alternative dual-rate resilient isolator 100' is shown at FIG. 8. In the bump pattern 104a, the bumps 104 are arranged as an outer ring $R_o$ of 18 circumferentially equally spaced (20 degrees apart) bumps disposed adjacent the perimeter P of the main body 100a'; an inner ring $R_i$ of 9 circumferentially equally spaced (40 degrees apart) bumps disposed adjacent the isolator central bore 100c; and a medial ring $R_m$ of 9 circumferentially equally spaced (40 degrees apart) bumps disposed nestingly in concentric relation between the outer and inner rings.

In order to derive an optimum distribution of the bumps 104, the number of bumps 104 may be altered from that depicted at FIG. 8. In so doing, it is useful to consider that the total spring stiffness of all the bumps as the summation of the spring stiffness of each individual bump across the first engagement surface. Accordingly, a preferred bump pattern 104b (of FIG. 5) is derived from the bump pattern 104a (of FIG. 8) by selectively removing bumps (shown in dashed lines at FIG. 8) 104', as follows: for each row, respectively, one bump 104' is removed, then two bumps 104 remain sequentially in circumferential succession. Thus, at FIG. 5, the preferred bump pattern 104b has the outer ring $R_o'$ having 12 bumps (disposed adjacent the perimeter P'), the inner ring $R_i'$ having 6 bumps (disposed adjacent the isolator central bore 100c), and the medial ring $R_m'$ having 6 bumps (disposed nestingly in concentric relation between the outer and inner rings). It is seen that the tuning of the first (softer) resiliency rate is achieved by selection of any of: number of bumps; changing the over-all pattern of the bumps; changing the height and/or cross-section and/or inclination of the surface of the bumps; and changing the resilient stiffness of the material.

Figure 5:
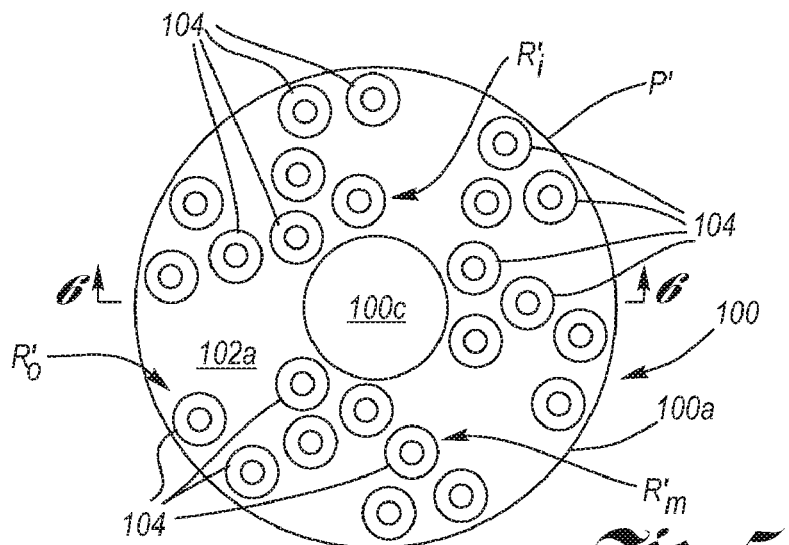
FIG. 5 is a top plan view of the dual-rate resilient isolator of FIG. 4.
Figure 6:
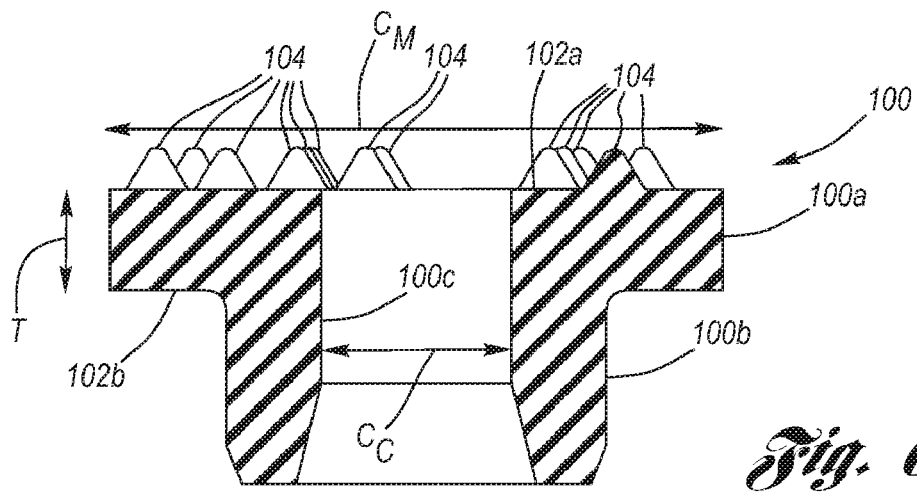
FIG. 6 is a cross-sectional view, seen along line 6-6 of FIG. 5.

By way of further dimensional exemplification, for the embodiment of FIG. 8, the first engagement surface 102a' may have an area, assuming $C_M$=48 mm and $C_C$=15 mm, of about 1,632.9 mm², and the collective basal area of the plurality of bumps 104, assuming $C_B$=5 mm and the number of bumps is 36, of about 706.9 mm², yielding an area ratio of the first engagement surface area to the bump collective area of about 2.3; and similarly for FIG. 5, where there are now 24 bumps, the area ratio is about 3.5. Accordingly, a range of area ratio of the engagement surface area to the bump collective area may be, for example, between about 1 and 5. Further by way of exemplification, the height ratio of T/H, assuming T=8 mm and H=3 mm is about 2.6. Accordingly, a range of height ratio of the thickness T of the isolator main body to the height H of the bumps may range, for example, from about 1 and 5.

Example

A subjective motor vehicle interior noise evaluation was performed using the General Motors' Uniform Test Scale (GMUTS), wherein:

| No. | Performance | Disturbance | Annoyance | Pereception by |
|---|---|---|---|---|
| 10 | Excellent | None | None, masked | No one |
| 9 | Excellent | None | Just detectable | Trained observer |
| 8 | Good | Trace | Slight | Critical observer |
| 7 | Good | Trace | Mild | Critical observer |
| 6 | Fair | Light | Moderate | Critical observer |
| 5 | Fair | Light | Complaint | Average observer |
| 4 | Poor | Annoying | Objectionable | All observers |
| 3 | Poor | Annoying | Strong objection | All observers |
| 2 | Bad | Severe | Redress required | All observers |

Various resilient isolators were tested and evaluated according to the GMUTS, comparing a non-shear type prior art resilient isolator, a shear-style prior art resilient isolator, and various forms of the dual-rate resilient isolator according to the present invention as per FIGS. 5 and 8, as indicated by the below table:

TABLE

| Isolator | Steering Wheel Vibration | Interior Noise | Evaluation |
|---|---|---|---|
| A | 5.0-5.5 | 5.0 | unacceptable |
| B | 5.5 | 6.0 | unacceptable |
| C | 6.0 | 6.0-6.5 | unacceptable |
| D | 6.5 | 6.5 | marginal |
| E | 6.5 | 6.5-7.0 | marginal |
| F | 6.5-7.0 | 7.0-7.5 | acceptable |
| G | 6.5-7.0 | 7.0-7.5 | acceptable |
| H | 6.5-7.0 | 7.0-7.5 | acceptable |
| I | 9.0 | 9.5 | acceptable | wherein: Isolator A is a prior art compression-style single-rate resilient isolator (generally analogous to FIG. 1), part number 25728136 of Ainak, Inc. of Winchester Ky.; Isolator B is a 60 durometer dual-rate resilient isolator according to the present invention as in FIG. 8; Isolator C is a 55 durometer dual-rate resilient isolator according to the present invention as in FIG. 8; Isolator D is a 55 durometer dual-rate resilient isolator according to the present invention as in FIG. 5; Isolator E is a 50 durometer dual-rate resilient isolator according to the present invention as in FIG. 8; Isolator F is a 50 durometer dual-rate resilient isolator according to the present invention as in FIG. 5; Isolator G is a 45 durometer dual-rate resilient isolator according to the present invention as in FIG. 8; Isolator H is a 45 durometer dual-rate resilient isolator according to the present invention as in FIG. 5; and Isolator I is a shear-style dual-rate prior art resilient isolator (generally analogous to FIG. 2), part number 25727687 of Allied Baltic Rubber, Inc. of Baltic Ohio.

FIG. 9 is a graph 200 of interior noise of a selected motor vehicle (microphone at passenger front seat location) over time for a selected cooling fan, wherein plot 202 is for Isolator A and plot 204 is for Isolator F, wherein the engine (3.6 L V6) was at a 600 RPM idle, high fan speed setting (2400 RPM). It is easily seen that Isolator F is far superior to Isolator A in terms of noise and vibration isolation.

Figure 10A:
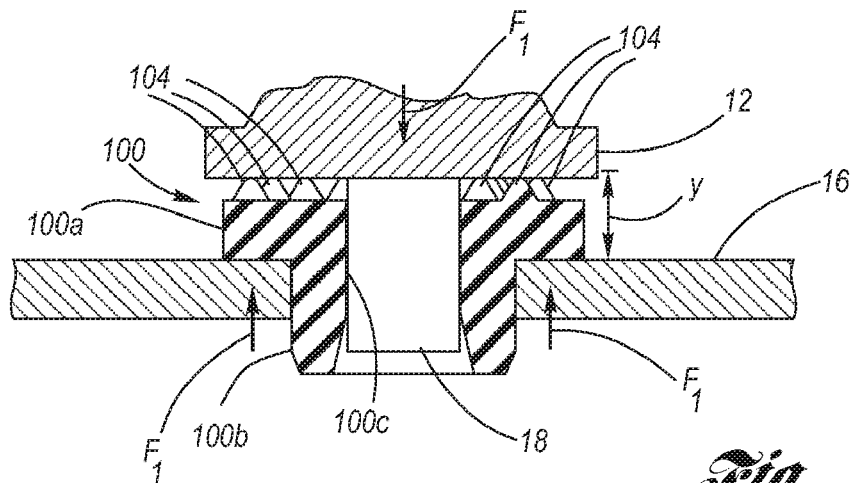
FIGS. 10A through 10C are a sequential series of cross-sectional side views of a dual-rate resilient isolator according to the present invention in operation responding to vibration, shown firstly subjected to a first vibration compression load within a first resiliency rate, shown secondly subjected to a second vibration compression load in a mid-range with respect to the first resiliency rate and a second resiliency rate, and shown thirdly subjected to a third vibration compression load at a second resiliency rate above the first resiliency rate.
Figure 10B:
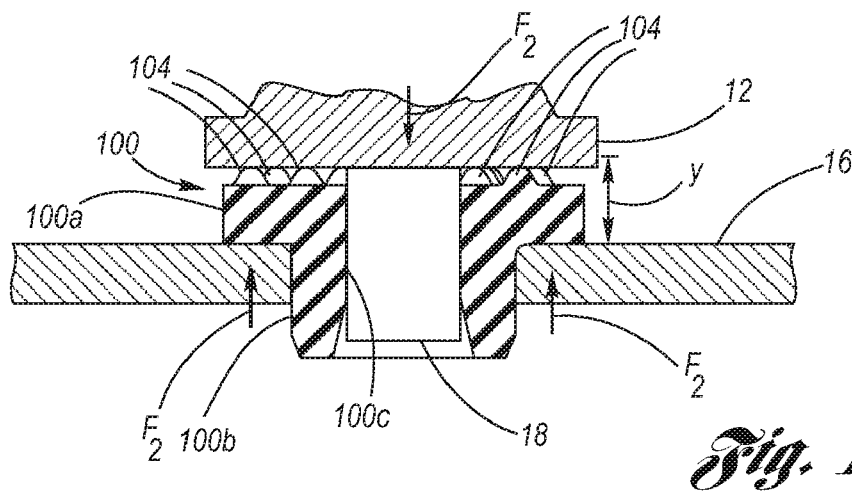
Figure 10C:
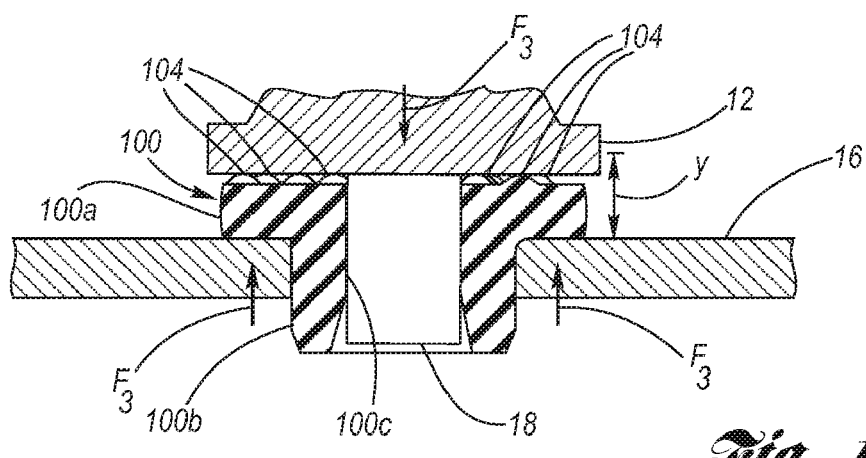

Referring now to FIGS. 10A through 10C, operation of a dual-rate resilient isolator 100 will be discussed.

Any CRFM produced fan noise vibration and/or other vibrations which are isolated by a soft resiliency of the bumps 104 so that these vibrations are decoupled from passing from the CRFM to the cradle and then through the frame of the motor vehicle; and pavement irregularities producing jarring vibrations are isolated by a hard resiliency of the main body 100a of the resilient isolator so as to prevent the cradle from delivering to the CRFM vibrations which can cause it to shake relative to the body of the motor vehicle.

At FIG. 3, where no vibration compression load is applied to the dual-stage resilient isolator 100, the mounting foot 12 is separated by a nominal distance Y from the cradle via the thickness of the isolator main body 100a and the height of the bumps 104.

At FIG. 10A, a first vibration amplitude of compressive force $F_1$, as for example due to low amplitude CRFM noise vibration and/or other vibrations, is applied to the dual-rate resilient isolator 100, such that the bumps 104 are resiliently compressed a relatively small amount, wherein the compression involves a relatively soft resiliency response of the plurality of the bumps, within a first resiliency rate limit.

At FIG. 10B a second vibration amplitude of compressive force $F_2$, as for example due to a high amplitude CRFM vibration or low amplitude road vibration, is applied to the dual-rate resilient isolator 100, such that the bumps 104 are resiliently compressed a relatively larger amount than in FIG.

10A, wherein the compression is of a generally mid-range between the first resiliency rate and a second resiliency rate.

At FIG. 10C, a third vibration amplitude compressive force $F_3$, as for example due to a jarring road vibration, is applied to the dual-rate resilient isolator 100, such that the bumps 104 are resiliently compressed a relatively larger amount than in FIG. 10B, and the main body additionally compresses, supplying a hard resiliency response as compared to the softer resiliency response supplied in the first resiliency rate.

Accordingly, it is seen that dual resiliency rates of resilient response are provided accordance with the present invention by the tuning of the plurality of bumps and the isolator main body.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. A dual-rate resilient isolator, comprising:
   a main body having a first engagement surface and an oppositely disposed second engagement surface; and
   a plurality of raised, generally conically shaped bumps disposed at said first engagement surface;
   wherein said main body is composed of a predetermined resilient material, and wherein said plurality of raised bumps is integrally formed with respect to the predetermined resilient material of said main body;
   wherein said main body has a perimeter; and wherein said plurality of raised bumps is arranged in a bump pattern at said first engagement surface, wherein said bump pattern comprises:
      an outer ring of the bumps disposed substantially adjacent said perimeter;
      an inner ring of the bumps disposed concentrically and radially inward with respect to said outer ring; and
      a medial ring of the bumps disposed concentrically with respect to said outer and inner rings, and medially disposed there between;
   wherein said outer ring comprises a plurality of outer ring bumps of said plurality of raised bumps which are circumferentially disposed such that, given an equally spaced disposition with respect to each other, circumferentially in sequence, after every second bump thereof, a bump is absent;
   wherein said inner ring comprises a plurality of inner ring bumps of said plurality of raised bumps which are circumferentially disposed such that, given an equally spaced disposition with respect to each other, circumferentially in sequence, after every second bump thereof, a bump is absent; and
   said medial ring comprises a plurality of medial ring bumps of said plurality of raised bumps which are circumferentially disposed such that, given an equally spaced disposition with respect to each other, circumferentially in sequence, after every second bump thereof, a bump is absent.

2. The dual-rate resilient isolator of claim 1, wherein each bump of said plurality of raised bumps comprises:
   a generally frustoconical shape having an apex spaced from said first engagement surface.

3. The dual-rate resilient isolator of claim 1, further comprising a sleeve integrally formed with said second engagement surface of said main body and oriented in normal relation thereto; wherein a central bore extends through said main body and said sleeve, said central bore being disposed centrally with respect to said perimeter and being oriented in axially normal relation with respect to said first and second engagement surfaces; and wherein said inner ring is disposed substantially adjacent said central bore.

4. The dual-rate resilient isolator of claim 3, wherein each bump of said plurality of raised bumps comprises:
   a generally frustoconical shape having an apex spaced from said first engagement surface.

5. The dual-rate resilient isolator of claim 1, wherein each said bump has a height, and said main body has a thickness, wherein a height ratio of said thickness to said height is substantially in a range of between about 1 and 5; and wherein said plurality of bumps has a bump collective area and said first engagement surface has an engagement surface area, wherein an area ratio of said engagement surface area to said bump collective area is substantially in a range of between about 1 and 5.

6. The dual-rate resilient isolator of claim 5, wherein each bump of said plurality of raised bumps comprises:
   a generally frustoconical shape having an apex spaced from said first engagement surface.

7. The dual-rate resilient isolator of claim 5, wherein said outer ring has substantially 12 bumps of said plurality of raised bumps, and said inner and medial rings each have substantially 6 bumps of said plurality of raised bumps.

8. The dual-rate resilient isolator of claim 7, wherein each bump of said plurality of raised bumps comprises:
   a generally frustoconical shape having an apex spaced from said first engagement surface.

9. The dual-rate resilient isolator of claim 1, wherein said outer ring has substantially 12 bumps of said plurality of raised bumps, and said inner and medial rings each have substantially 6 bumps of said plurality of raised bumps.

10. A dual-rate resilient isolator, comprising:
   a main body having a first engagement surface, an oppositely disposed second engagement surface, and a perimeter; and
   a plurality of generally conically shaped bumps disposed in a bump pattern across said first engagement surface, each bump of said plurality of bumps being raised in an axial direction which is normal to said first engagement surface;
   wherein said main body is composed of a predetermined resilient material, and wherein said plurality of bumps is integrally formed with respect to the predetermined resilient material of said main body;
   wherein when said dual-rate isolator is subjected to vibration in the axial direction, said plurality of bumps provide a first rate of resilient response thereto, and said main body provides a second rate of resilient response thereto, wherein said first rate is resiliently softer than said second rate;
   wherein said bump pattern comprises:
      an outer ring of the bumps disposed substantially adjacent said perimeter;
      an inner ring of the bumps disposed concentrically and radially inward with respect to said outer ring; and
      a medial ring of the bumps disposed concentrically with respect to said outer and inner rings, and medially disposed there between;
   wherein said outer ring comprises a plurality of outer ring bumps of said plurality of raised bumps which are circumferentially disposed such that, given an equally spaced disposition with respect to each other, circumferentially in sequence, after every second bump thereof, a bump is absent;

wherein said inner ring comprises a plurality of inner ring bumps of said plurality of raised bumps which are circumferentially disposed such that, given an equally spaced disposition with respect to each other, circumferentially in sequence, after every second bump thereof, a bump is absent; and wherein said medial ring comprises a plurality of medial ring bumps of said plurality of raised bumps which are circumferentially disposed such that, given an equally spaced disposition with respect to each other, circumferentially in sequence, after every second bump thereof, a bump is absent.

11. The dual-rate resilient isolator of claim 10, wherein said predetermined pattern is preselected so as to distribute loads of the vibration generally across the first engagement surface.

12. The dual-rate resilient isolator of claim 11, wherein each bump of said plurality of raised bumps comprises:
a generally frustoconical shape having an apex spaced from said first engagement surface.

13. A mounting system for a condenser, radiator, fan module (CRFM) of a motor vehicle, comprising:
at least one mounting foot connected with a CRFM;
a cradle connected to a frame of the motor vehicle; and
a dual-rate resilient isolator disposed in abutting relation between a respective said mounting foot and said cradle, said dual-rate resilient isolator comprising:
a main body having a first engagement surface, an oppositely disposed second engagement surface, and a perimeter; and
a plurality of bumps disposed in a bump pattern across said first engagement surface, each bump of said plurality of bumps being raised in an axial direction which is normal to said first engagement surface;
wherein said main body is composed of a predetermined resilient material, and wherein said plurality of raised bumps is integrally formed with respect to the predetermined resilient material of said main body;
wherein when vibration originating at either of said cradle and the CRFM is subjected to the dual-rate resilient isolator in the axial direction, said plurality of bumps provide a first rate of resilient response thereto, and said main body provides a second rate of resilient response thereto, wherein said first rate is resiliently softer than said second rate such that the vibration originating at one of the cradle and the CRFM is mitigated with respect to the other at said dual-rate resilient isolator;
wherein said plurality of raised bumps is arranged in a bump pattern at said first engagement surface, wherein said bump pattern comprises:
an outer ring of the bumps disposed substantially adjacent said perimeter;
an inner ring of the bumps disposed concentrically and radially inward with respect to said outer ring; and
a medial ring of the bumps disposed concentrically with respect to said outer and inner rings, and medially disposed there between;
wherein said outer ring comprises a plurality of outer ring bumps of said plurality of raised bumps which are circumferentially disposed such that, given an equally spaced disposition with respect to each other, circumferentially in sequence, after every second bump thereof, a bump is absent;
wherein said inner ring comprises a plurality of inner ring bumps of said plurality of raised bumps which are circumferentially disposed such that, given an equally spaced disposition with respect to each other, circumferentially in sequence, after every second bump thereof, a bump is absent; and
wherein said medial ring comprises a plurality of medial ring bumps of said plurality of raised bumps which are circumferentially disposed such that, given an equally spaced disposition with respect to each other, circumferentially in sequence, after every second bump thereof, a bump is absent.

14. The mounting system of claim 13, wherein said predetermined pattern is preselected so as to distribute loads of the vibration generally across the first engagement surface.

15. The mounting system of claim 14, further comprising:
a sleeve integrally formed with said second engagement surface of said main body, said sleeve being oriented in the axial direction; wherein a central bore extends through said main body and said sleeve, said central bore being disposed centrally with respect to said perimeter and being oriented in the axial direction; and
an alignment stud connected with each respective mounting foot;
wherein the alignment stud of the respective mounting foot is received by said central bore.

* * * * *

UNITED STATES PATENT AND TRADEMARK OFFICE
CERTIFICATE OF CORRECTION

| | | |
|---|---|---|
| PATENT NO. | : 8,016,275 B2 | Page 1 of 1 |
| APPLICATION NO. | : 12/058818 | |
| DATED | : September 13, 2011 | |
| INVENTOR(S) | : Kent Ting et al. | |

It is certified that error appears in the above-identified patent and that said Letters Patent is hereby corrected as shown below:

The Assignee data is amended to read as follows:

GM Global Technology Operations LLC, Detroit, MI (US) and

Denso International America, Inc., Southfield, MI (US)

Signed and Sealed this
Tenth Day of January, 2012

David J. Kappos
*Director of the United States Patent and Trademark Office*